US012420653B2

(12) United States Patent
Aoki

(10) Patent No.: US 12,420,653 B2
(45) Date of Patent: Sep. 23, 2025

(54) VEHICLE AND POWER APPARATUS

(71) Applicant: TOYOTA JIDOSHA KABUSHIKI KAISHA, Toyota (JP)

(72) Inventor: Yuya Aoki, Miyoshi (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 59 days.

(21) Appl. No.: 18/438,954

(22) Filed: Feb. 12, 2024

(65) Prior Publication Data
US 2024/0278661 A1 Aug. 22, 2024

(30) Foreign Application Priority Data
Feb. 20, 2023 (JP) ................. 2023-024273

(51) Int. Cl.
*B60L 53/16* (2019.01)
*G07C 5/08* (2006.01)
*G07C 9/00* (2020.01)
(52) U.S. Cl.
CPC ............ *B60L 53/16* (2019.02); *G07C 5/0816* (2013.01); *G07C 9/00309* (2013.01); *G07C 2009/00507* (2013.01)

(58) Field of Classification Search
None
See application file for complete search history.

(56) References Cited

U.S. PATENT DOCUMENTS

| 12,012,073 B2 * | 6/2024 | Zhang .................. B60R 25/102 |
| 2015/0329002 A1 | 11/2015 | Broecker et al. |
| 2021/0107370 A1 | 4/2021 | Ando et al. |

FOREIGN PATENT DOCUMENTS

| DE | 102019127976 A1 | 4/2021 |
| JP | 2020-141483 A | 9/2020 |
| JP | 2021-061713 A | 4/2021 |

\* cited by examiner

*Primary Examiner* — K. Wong
(74) *Attorney, Agent, or Firm* — Dinsmore & Shohl LLP

(57) ABSTRACT

A vehicle includes a vehicle inlet to which a vehicle plug that allows external power feed is connected, an electronic lock that locks the vehicle inlet and the vehicle plug, and a vehicle controller that controls the electronic lock. When output in external power feed is larger than 16 A (a prescribed value) at the time of reception of a request for release of locking by the electronic lock from a user, the vehicle controller prohibits release of locking by the electronic lock. When the output in external power feed is equal to or lower than 16 A at the time of reception of the request for release of locking by the electronic lock from the user, the vehicle controller releases locking by the electronic lock.

7 Claims, 6 Drawing Sheets

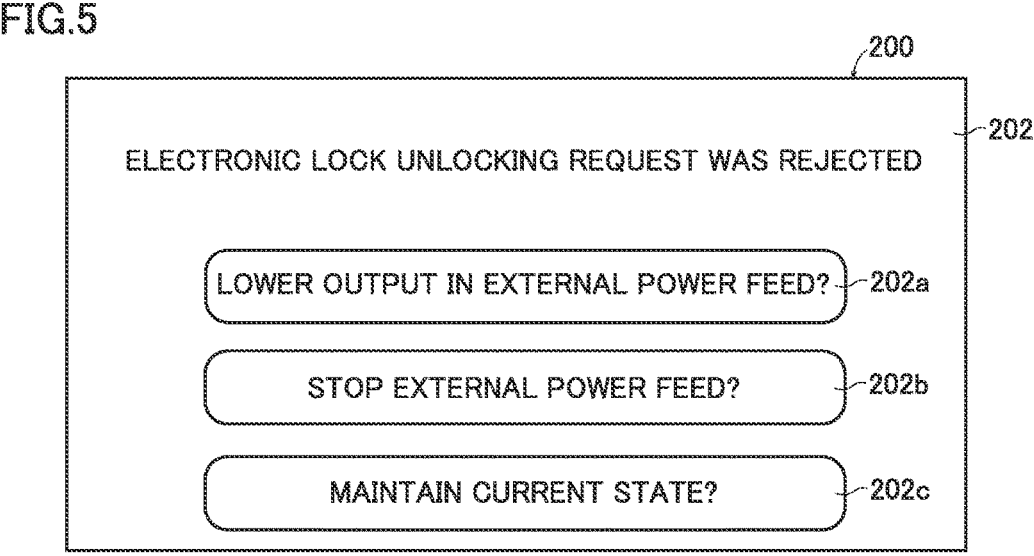
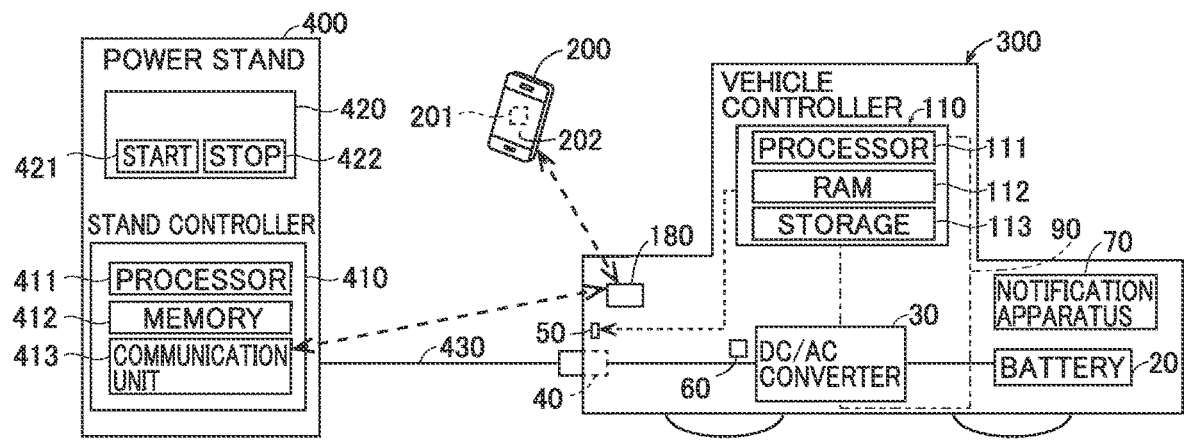

VEHICLE AND POWER APPARATUS

CROSS REFERENCE TO RELATED APPLICATIONS

This nonprovisional application is based on Japanese Patent Application No. 2023-024273 filed with the Japan Patent Office on Feb. 20, 2023, the entire contents of which are hereby incorporated by reference.

BACKGROUND

Field

The present disclosure relates to a vehicle and a power apparatus.

Description of the Background Art

Japanese Patent Laying-Open No. 2020-141483 discloses a vehicle including a connector locking apparatus that locks a charging connector to a charging inlet and a vehicle controller. When the charging connector is not detached from the charging inlet after the connector is unlocked in coordination with an operation to unlock a door, the vehicle controller automatically has the charging connector locked again for resuming external charging.

SUMMARY

In the vehicle disclosed in Japanese Patent Laying-Open No. 2020-141483, during a period from unlocking of the connector until locking again thereof, charging is not carried out. Therefore, when the connector is unlocked in coordination with unlocking of the door during external charging, charging may unintentionally be stopped. Therefore, suppression of unintended stop of external charging or external power feed has been demanded.

The present disclosure was made to solve the problem above, and an object thereof is to provide a vehicle and a power apparatus that can achieve suppression of unintended stop of external charging or external power feed.

A vehicle according to a first aspect of the present disclosure includes a secondary battery, a vehicle inlet to which a vehicle plug is connected, the vehicle plug allowing power transmission including at least one of external charging and external power feed, an electronic lock that locks the vehicle inlet and the vehicle plug, and a vehicle controller that controls the electronic lock. When output in the power transmission is larger than a prescribed value at the time of reception of a request for release of locking by the electronic lock from a user, the vehicle controller prohibits release of locking of the electronic lock, and when output in the power transmission is equal to or lower than the prescribed value at the time of reception of the request for release of locking by the electronic lock from the user, the vehicle controller releases locking by the electronic lock.

In the vehicle according to the first aspect of the present disclosure, when output in power transmission is larger than the prescribed value at the time of reception of the request for release of locking by the electronic lock, release of locking by the electronic lock is prohibited as set forth above. Thus, release of locking by the electronic lock based on the request for release of locking by the electronic lock when output in power transmission is larger than the prescribed value because of ongoing external charging or external power feed can be prevented. Consequently, unintended stop of external charging or external power feed can be suppressed. In the vehicle according to the first aspect, when output in power transmission is equal to or lower than the prescribed value at the time of reception of the request for release of locking by the electronic lock, locking by the electronic lock is released. When output in power transmission is equal to or lower than the prescribed value because of external charging or external power feed not being performed, locking by the electronic lock can be released based on the request for release of locking by the electronic lock.

In the vehicle according to the first aspect, while locking by the electronic lock is inactive, the vehicle controller prohibits start of the power transmission under a condition that output in the power transmission is larger than the prescribed value. According to such a configuration, a threshold value of output at which power transmission is started while locking by the electronic lock is inactive can be equal to a threshold value of output at which release of locking by the electronic lock is permitted.

The vehicle according to the first aspect further includes a notification apparatus that gives a notification to the user. When the vehicle controller prohibits release of locking by the electronic lock because of the output in the power transmission being larger than the prescribed value at the time of reception of the request for release of locking by the electronic lock from the user, the vehicle controller controls the notification apparatus to give a notification that the output in the power transmission is larger than the prescribed value. According to such a configuration, the user can know through the notification apparatus that output in power transmission is larger than the prescribed value.

The vehicle according to the first aspect further includes a communication apparatus that communicates with a terminal capable of receiving an operation by the user. When the vehicle controller prohibits release of locking by the electronic lock because of the output in the power transmission being larger than the prescribed value, the communication apparatus transmits to the terminal, a signal about release of locking by the electronic lock. According to such a configuration, the user can obtain through the terminal, information on release of locking by the electronic lock.

In the vehicle according to the first aspect, the request for release of locking by the electronic lock includes a first request and a second request different from the first request. When the output in the power transmission is larger than the prescribed value at the time of reception of the first request from the user, the vehicle controller prohibits release of locking by the electronic lock, when the output in the power transmission is equal to or lower than the prescribed value at the time of reception of the first request from the user, the vehicle controller releases locking by the electronic lock, and at the time of reception of the second request from the user, regardless of the output in the power transmission, the vehicle controller controls the output in the power transmission to be equal to or lower than the prescribed value and releases locking by the electronic lock. According to such a configuration, when the first request is received, release of locking by the electronic lock can be controlled based on magnitude of output in power transmission. Alternatively, when the second request is received, locking by the electronic lock can forcibly be released regardless of magnitude of output in power transmission.

In this case, the vehicle further includes a vehicle door for entry into and exit from the vehicle. The first request is a request for release of locking by the electronic lock in coordination with unlocking of the vehicle door. The second request is a request for release of locking by the electronic lock based on pressing of an unlocking button provided in the vehicle plug. According to such a configuration, when the request for release of locking by the electronic lock in coordination with unlocking of the vehicle door is received, release of locking by the electronic lock can be controlled based on magnitude of output in power transmission. When an unlocking request based on pressing of the unlocking button is received, locking by the electronic lock can forcibly be released regardless of magnitude of output in power transmission.

A power apparatus according to a second aspect of the present disclosure includes a vehicle plug that allows power transmission including at least one of external charging and external power feed by being connected to a vehicle inlet of a vehicle on which a secondary battery is mounted and an apparatus-side controller that controls an electronic lock that locks the vehicle inlet and the vehicle plug. When output in the power transmission is larger than a prescribed value at the time of reception of a request for release of locking by the electronic lock from a user, the apparatus-side controller prohibits release of locking by the electronic lock, and when output in the power transmission is equal to or lower than the prescribed value at the time of reception of the request for release of locking by the lock from the user, the apparatus-side controller releases locking by the electronic lock. Control of the electronic lock covers broad meaning including also indirect control of the electronic lock by transmission of a command to control the electronic lock to the vehicle.

In the vehicle according to the second aspect of the present disclosure, as set forth above, when output in power transmission is larger than the prescribed value at the time of reception of the request for release of locking by the electronic lock, release of locking by the electronic lock is prohibited. Alternatively, when output in power transmission is equal to or lower than the prescribed value at the time of reception of the request for release locking by the electronic lock, locking by the electronic lock is released. The power apparatus that can achieve suppression of unintended stop of external charging or external power feed when output in power transmission is larger than the prescribed value can thus be provided. Furthermore, the power apparatus that can release locking based on the request for release of locking by the electronic lock when output in power transmission is equal to or lower than the prescribed value can be provided.

The foregoing and other objects, features, aspects and advantages of this disclosure will become more apparent from the following detailed description of this disclosure when taken in conjunction with the accompanying drawings.

BRIEF DESCRIPTION OF THE DRAWINGS

FIG. 5 is a diagram showing a screen on a portable terminal according to the first embodiment.

FIG. 6 is a diagram showing a configuration of a power stand and a vehicle according to a second embodiment.

DESCRIPTION OF THE EMBODIMENTS

Figure 1:
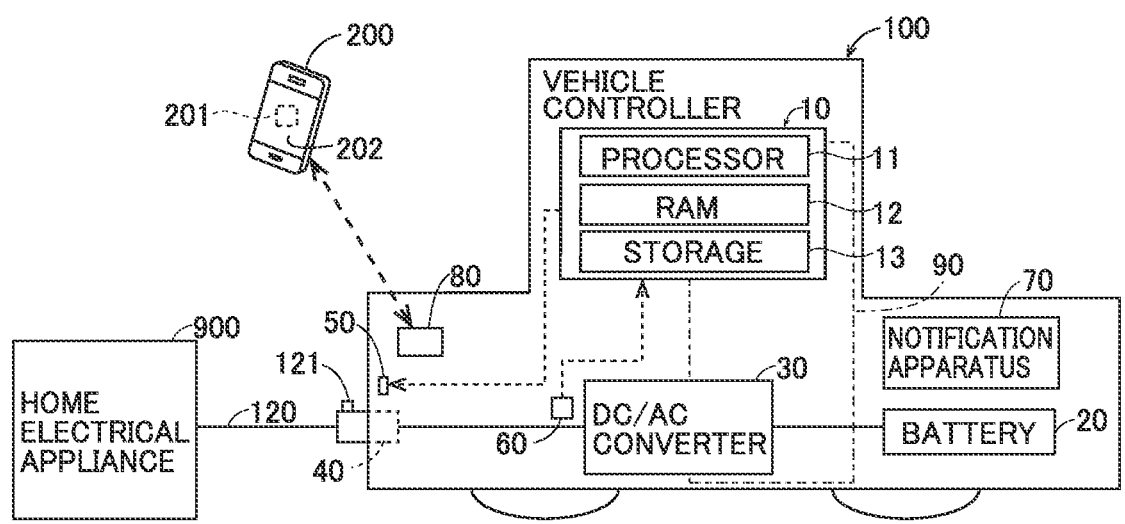
FIG. 1 is a diagram showing a configuration of a vehicle according to a first embodiment.

An embodiment of the present disclosure will be described in detail below with reference to the drawings. The same or corresponding elements in the drawings have the same reference characters allotted and description thereof will not be repeated.

First Embodiment

<Overall Configuration>

FIG. 1 is a diagram showing a configuration of a vehicle 100 according to a first embodiment. Vehicle 100 includes a vehicle controller (an electronic control unit: ECU) 10, a battery 20, a direct-current (DC)/alternating-current (AC) converter 30, a vehicle inlet 40, an electronic lock 50, a current sensor 60, a notification apparatus 70, a communication apparatus 80, and a vehicle door 90. Battery 20 is an exemplary "secondary battery" in the present disclosure. Only a single vehicle door 90 is shown for the sake of simplification.

Vehicle 100 is, for example, a battery electric vehicle (BEV). Vehicle 100 may be a hybrid electric vehicle (HEV), a plug-in hybrid electric vehicle (PHEV), or a fuel cell electric vehicle (FCEV). Battery 20 is a power storage device where electric power for driving vehicle 100 is stored.

Vehicle inlet 40 is constructed such that a vehicle plug 120 that allows external power feed to a home electrical appliance 900 (for example, a rice cooker or a refrigerator) can be connected thereto. Vehicle 100 is electrically connected to home electrical appliance 900 by connection of vehicle plug 120 to vehicle inlet 40. External power feed for supply of electric power in battery 20 to home electrical appliance 900 can thus be carried out. External power feed is exemplary "power transmission" in the present disclosure.

Electronic lock 50 locks vehicle inlet 40 and vehicle plug 120. Specifically, vehicle inlet 40 and vehicle plug 120 are locked by change of a position of electronic lock 50 to press a not-shown mechanical lock provided in vehicle plug 120. The mechanical lock performs a function to engage vehicle plug 120 with vehicle inlet 40. The position of electronic lock 50 is controlled by vehicle controller 10. In other words, vehicle controller 10 controls a state of connection between vehicle inlet 40 and vehicle plug 120. Release of locking between vehicle inlet 40 and vehicle plug 120 by electronic lock 50 is expressed as unlocking of electronic lock 50 below.

Vehicle controller 10 controls external power feed from vehicle 100 to home electrical appliance 900. Vehicle controller 10 includes a processor 11, a random access memory (RAM) 12, and a storage 13. Processor 11 includes, for example, a central processing unit (CPU). RAM 12 includes a work memory where data processed by processor 11 is temporarily stored. Storage 13 is configured such that information put thereinto can be stored. Not only a program but also information (for example, a map, a mathematical expression, and various parameters) used in the program is stored in storage 13. In the first embodiment, various types of control in vehicle controller 10 are carried out by execution by processor 11, of the program stored in storage 13.

DC/AC converter 30 converts DC power in battery 20 into AC power. AC power from the DC/AC converter is thus supplied to home electrical appliance 900 through vehicle plug 120.

Current sensor 60 detects output in external power feed. Specifically, current sensor 60 detects a value of a current that flows between vehicle inlet 40 and DC/AC converter 30. The value of the current detected by current sensor 60 is transmitted to vehicle controller 10.

Notification apparatus 70 gives a notification to a user of vehicle 100. For example, in the first embodiment, notification apparatus 70 is a car navigation system (display apparatus). Notification apparatus 70 may be an audio output portion that outputs only voice and sound.

Communication apparatus 80 communicates with a portable terminal 200 (for example, a smartphone) of the user of vehicle 100. Communication apparatus 80 may communicate with a PC or a tablet of the user. Portable terminal 200 is an exemplary "terminal" in the present disclosure.

In a conventional vehicle in which an electronic lock is automatically activated a prescribed time period after unlocking of the electronic lock, external power feed is not carried out for the prescribed time period. Therefore, when the electronic lock is unlocked in coordination, for example, with unlocking of a vehicle door during external power feed, external power feed may unintentionally be stopped. Therefore, suppression of unintended stop of external power feed has been demanded.

In the first embodiment, when output in external power feed is larger than 16 A at the time of reception of a request for unlocking of electronic lock 50 from the user, vehicle controller 10 prohibits unlocking of electronic lock 50, and when output in external power feed is equal to or lower than 16 A at the time of reception of the request for unlocking of electronic lock 50 from the user, vehicle controller 10 unlocks electronic lock 50. Suppression of stop of external power feed due to unlocking of electronic lock 50 while output in external power feed is larger than 16 A because of ongoing external power feed can be suppressed. Specific description will be given with reference to a flow shown in FIG. 2.

<Method of Controlling Electronic Lock>

Figure 2:
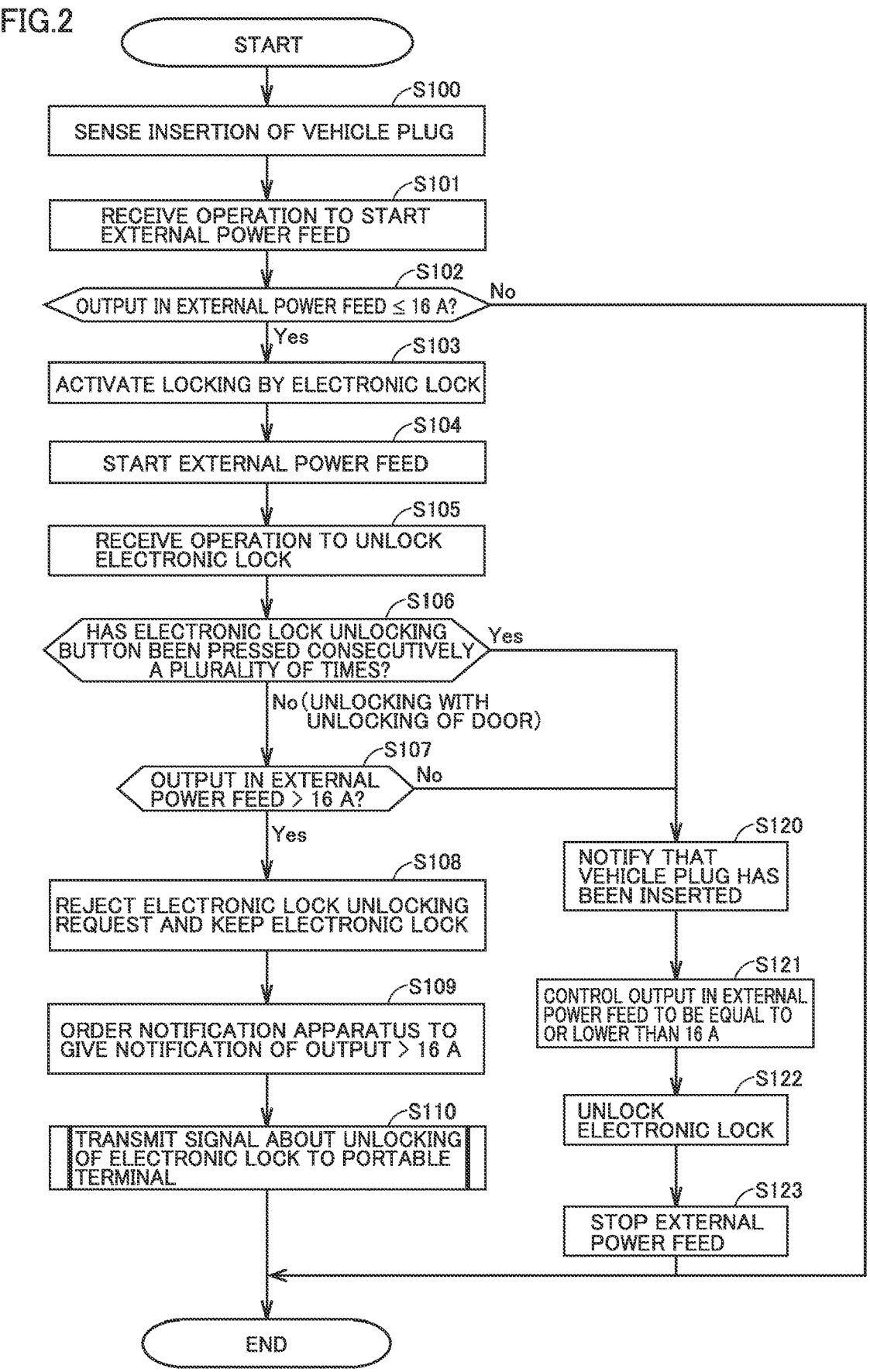
FIG. 2 is a flowchart showing control by a vehicle controller according to the first embodiment.

A method of control of electronic lock 50 by vehicle controller 10 will now be described with reference to a flowchart in FIG. 2.

In step S100, vehicle controller 10 senses insertion of vehicle plug 120 into vehicle inlet 40. Specifically, vehicle controller 10 senses insertion of vehicle plug 120 into vehicle inlet 40 based on change in resistance value (in vehicle 100) or the like caused by insertion of vehicle plug 120 into vehicle inlet 40.

In step S101, vehicle controller 10 receives an operation by the user of vehicle 100 to start external power feed. For example, vehicle controller 10 senses that the operation to start external power feed has been performed, by receiving a prescribed signal based on the operation to start external power feed by the user. The operation to start external power feed is, for example, pressing of a button 121 (see FIG. 1) in vehicle plug 120 once. Button 121 is an exemplary "unlocking button" in the present disclosure.

In step S102, vehicle controller 10 determines whether or not output in external power feed is equal to or lower than 16 A. Specifically, vehicle controller 10 determines whether or not a detection value from current sensor 60 is equal to or lower than 16 A. When the output is equal to or lower than 16 A (Yes in S102), the process proceeds to step S103. When the output is larger than 16 A (No in S102), the process ends. At the time point in step S102, locking by electronic lock 50 has not yet been activated.

In step S103, vehicle controller 10 activates locking by electronic lock 50 (sets a locked state). Specifically, vehicle controller 10 changes (moves) a position of electronic lock 50 such that the mechanical lock is pressed by electronic lock 50 (movement of the mechanical lock is restricted by electronic lock 50).

In step S104, vehicle controller 10 starts control of external power feed for supply of electric power in battery 20 to home electrical appliance 900. Specifically, vehicle controller 10 starts external power feed by controlling on and off of a not-shown switching element of DC/AC converter 30.

In step S105, vehicle controller 10 receives an operation (unlocking request) to unlock electronic lock 50 by the user.

In step S106, vehicle controller 10 determines whether or not the operation to unlock electronic lock 50 received in step S105 is an operation to press button 121 (see FIG. 1) provided in vehicle plug 120 consecutively a plurality of times (for example, three times). When button 121 is pressed consecutively a plurality of times (Yes in S106), the process proceeds to step S120. When button 121 has not been pressed consecutively a plurality of times (No in S106), the process proceeds to step S107. An unlocking operation when button 121 is not pressed consecutively a plurality of times is an operation to unlock electronic lock 50 in coordination with unlocking of vehicle door 90 (see FIG. 1).

In step S107, vehicle controller 10 determines whether or not output in external power feed is larger than 16 A. Specifically, vehicle controller 10 determines whether or not the detection value from current sensor 60 is larger than 16 A. When the output is larger than 16 A (Yes in S107), the process proceeds to step S108. When the output is equal to or lower than 16 A (No in S107), the process proceeds to step S120.

In step S108, vehicle controller 10 rejects the request to unlock electronic lock 50. In other words, vehicle controller 10 prohibits unlocking of electronic lock 50. The state of locking by electronic lock 50 is thus kept.

Figure 3:
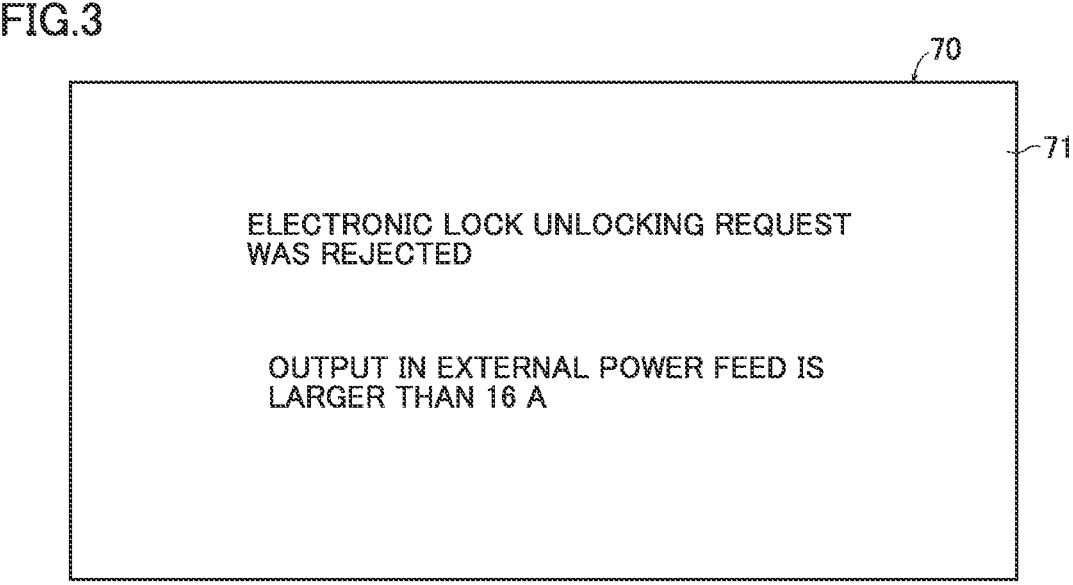
FIG. 3 is a diagram showing notification representation in a notification apparatus according to the first embodiment.

In step S109, vehicle controller 10 transmits a command signal to notification apparatus 70 to have notification apparatus 70 (car navigation system) notify that output (detection value from current sensor 60) in external power feed is larger than 16 A. Thus, as shown in FIG. 3, a message that the request to unlock electronic lock 50 was rejected is shown on a screen 71 of notification apparatus 70. In addition, a message that output in external power feed is larger than 16 A is shown on screen 71. Consequently, the user can know that external power feed is going on. Start of vehicle 100 by the user during external power feed can thus be suppressed.

Referring again to FIG. 2, in step S110, vehicle controller 10 transmits a signal about unlocking of electronic lock 50 to portable terminal 200. Specifically, vehicle controller 10 carries out control to transmit a signal for showing that the request to unlock electronic lock 50 was rejected to portable terminal 200 through communication apparatus 80. A message that the request to unlock electronic lock 50 was rejected is thus shown on a screen 202 (see FIG. 5) of portable terminal 200. Detailed processing in step S110 will be described later.

In step S120, vehicle controller 10 carries out control to give a notification through notification apparatus 70 that vehicle plug 120 has been inserted in vehicle inlet 40. Thus, start of vehicle 100 by the user while vehicle plug 120 remains connected, in particular when the operation to unlock electronic lock 50 is performed with unlocking of vehicle door 90 (No in S106), can be suppressed.

In step S121, vehicle controller 10 controls output in external power feed to be equal to or lower than 16 A. For example, vehicle controller 10 controls the output in external power feed to be equal to or lower than 16 A by changing an on and off cycle (duty ratio) of the not-shown switching element of DC/AC converter 30. When the output in external power feed has already been equal to or lower than 16 A, processing in step S121 is not performed.

In step S122, vehicle controller 10 performs processing for unlocking electronic lock 50. Specifically, vehicle controller 10 changes (moves) the position of electronic lock 50 to remove pressing against the mechanical lock by electronic lock 50.

In step S123, vehicle controller 10 performs processing for stopping external power feed. For example, vehicle controller 10 stops external power feed by stopping on and off of the not-shown switching element (setting a constantly off state) of DC/AC converter 30. Thereafter, the process ends.

<Processing in Step S110>

Figure 4:
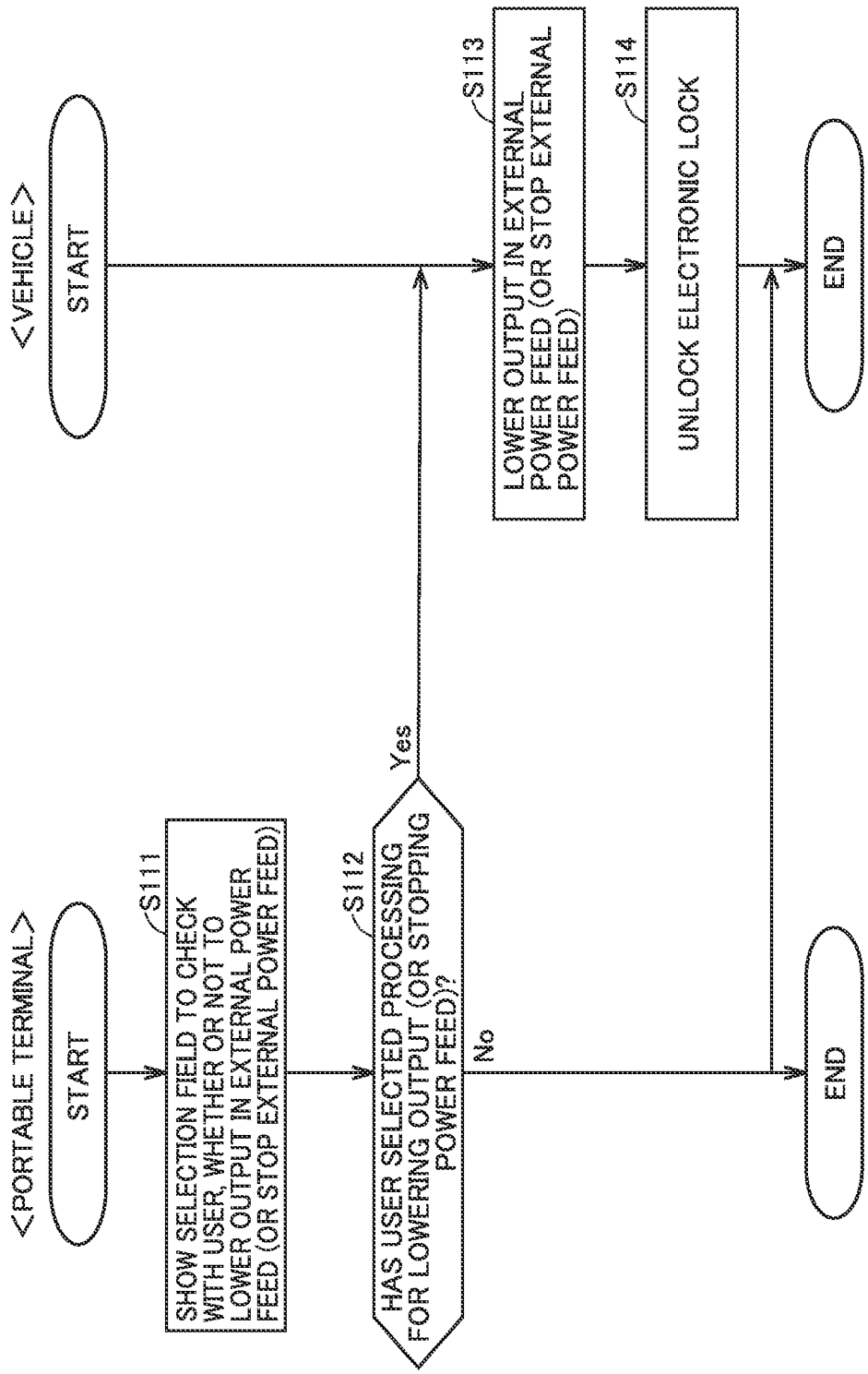
FIG. 4 is a flowchart showing detailed control in step S110 in FIG. 2.

As shown in FIG. 4, in step S111, a control unit 201 (see FIG. 1) of portable terminal 200 has a selection button 202a (see FIG. 5) shown on screen 202 (see FIG. 1) of portable terminal 200, selection button 202a being a button for performing processing for lowering output in external power feed. Control unit 201 has a selection button 202b (see FIG. 5) shown on screen 202, selection button 202b being a button for performing processing for stopping external power feed. Control unit 201 has a selection button 202c (see FIG. 5) shown on screen 202, selection button 202c being a button for performing processing for maintaining a current state.

In step S112, control unit 201 of portable terminal 200 determines whether or not processing for lowering output in external power feed (or stopping external power feed) has been selected by selection of selection button 202a (or selection button 202b). When processing for lowering output in external power feed (or stopping external power feed) has been selected (Yes in S112), the process proceeds to step S113. When processing for maintaining the current state is selected by selection of selection button 202c (No in S112), the process ends.

In step S113, when selection button 202a is selected in step S112, vehicle controller 10 performs processing for lowering output in external power feed. Specifically, vehicle controller 10 controls, for example, the on and off cycle (duty ratio) of the not-shown switching element of DC/AC converter 30 to set output in external power feed to be equal to or lower than 16 A.

Alternatively, when selection button 202b is selected in step S112, vehicle controller 10 performs processing for stopping external power feed. Specifically, vehicle controller 10 stops, for example, on and off of the not-shown switching element of DC/AC converter 30 (sets the constantly off state) to stop external power feed.

In step S114, vehicle controller 10 unlocks electronic lock 50. Specifically, vehicle controller 10 changes the position of electronic lock 50 to remove pressing against the mechanical lock by electronic lock 50.

As set forth above, in the first embodiment, when output in external power feed is larger than 16 A at the time of reception of the request for unlocking of electronic lock 50 from the user, vehicle controller 10 prohibits unlocking of electronic lock 50. Unlocking of electronic lock 50 during ongoing external power feed to home electrical appliance 900 can be suppressed based on magnitude of output in external power feed. Consequently, unintended stop of external power feed can be suppressed, and hence efficiency in external power feed can be improved.

Second Embodiment

Unlike the first embodiment in which home electrical appliance 900 is fed with power, in a second embodiment, a power stand 400 is fed with power. A feature the same as in the first embodiment has the same reference numeral allotted and description will not be repeated.

<Overall Configuration>

FIG. 6 is a diagram showing a configuration of a vehicle 300 and power stand 400 according to the second embodiment. Power stand 400 is an exemplary "power apparatus" in the present disclosure.

Vehicle 300 includes a vehicle controller 110, battery 20, DC/AC converter 30, vehicle inlet 40, electronic lock 50, current sensor 60, notification apparatus 70, a communication apparatus 180, and vehicle door 90. Vehicle controller 110 includes a processor 111, a RAM 112, and a storage 113.

Communication apparatus 180 communicates with each of portable terminal 200 of a user of vehicle 300 and a later-described communication unit 413 of power stand 400.

Vehicle controller 110 carries out control to transmit a value of a current detected by current sensor 60 to communication unit 413 of power stand 400 through communication apparatus 180.

Power stand 400 includes a stand controller 410 and an operation terminal 420. Stand controller 410 includes a processor 411, a memory 412, and communication unit 413. Processor 411 controls communication unit 413. Not only a program executed by processor 411 but also information (for example, a map, a mathematical expression, and various parameters) used in the program is stored in memory 412. Stand controller 410 is an exemplary "apparatus-side controller" in the present disclosure. Power stand 400 includes a vehicle plug 430 that allows external power feed (power feed from vehicle 300 to power stand 400) by being connected to vehicle inlet 40.

<Method of Controlling Electronic Lock>

Figure 7:
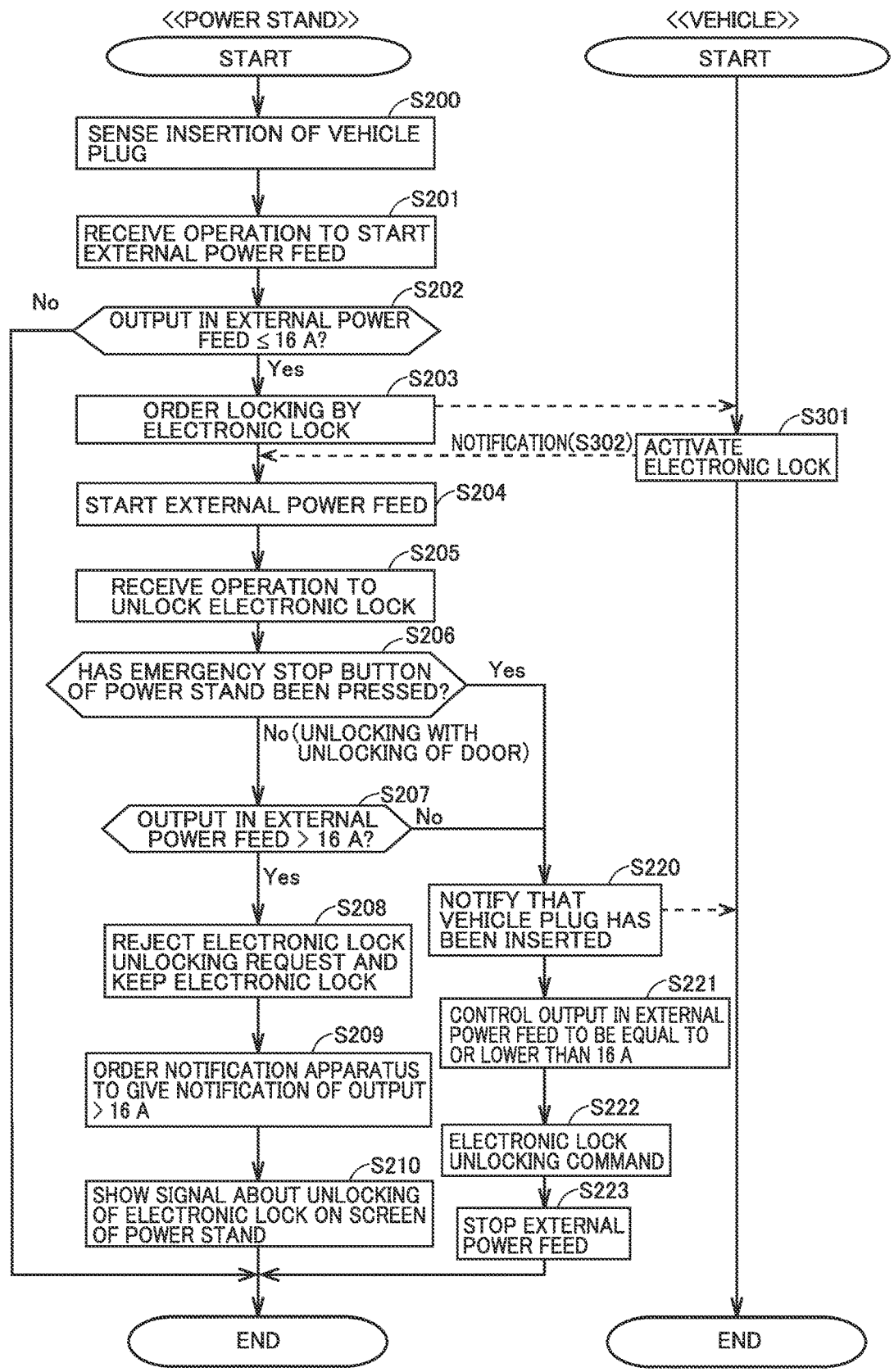
FIG. 7 is a flowchart showing control by a stand controller according to the second embodiment.

A method of control of electronic lock 50 by stand controller 410 will now be described with reference to a flowchart in FIG. 7. Description of processing similar to that in the first embodiment will be simplified or omitted.

In step S200, stand controller 410 senses insertion of vehicle plug 430 into vehicle inlet 40. For example, stand controller 410 senses insertion of vehicle plug 430 in vehicle inlet 40 based on a signal transmitted from vehicle 300. Alternatively, stand controller 410 may sense insertion of vehicle plug 430 into vehicle inlet 40 based on change in resistance value in stand controller 410.

In step S201, stand controller 410 receives an operation to start external power feed by the user. For example, stand controller 410 senses that the operation to start external power feed has been performed based on selection of a power feed start button 421 provided in operation terminal 420 (see FIG. 6). In step S201, information on each parameter (a power feed voltage, a power feed current, and the like) relating to external power feed is exchanged between vehicle 300 and power stand 400.

In step S202, stand controller 410 determines whether or not output in external power feed is equal to or lower than 16 A. Specifically, stand controller 410 determines whether or not a detection value from current sensor 60 is equal to or lower than 16 A. When output in external power feed is equal to or lower than 16 A (Yes in S202), the process proceeds to step S203. When the output in external power feed is larger than 16 A (No in S202), the process ends. At the time point in step S202, locking by electronic lock 50 has not yet been activated.

In step S203, power stand 400 transmits a command signal for locking by electronic lock 50 to vehicle 300 through communication unit 413. In step S301, vehicle controller 110 activates electronic lock 50 (sets the locked state) based on the command signal in step S203. In step S302, vehicle controller 110 notifies power stand 400 of activation of (locking by) electronic lock 50 through communication apparatus 180.

In step S204, stand controller 410 starts control of external power feed for supply of electric power from vehicle 300 to power stand 400.

In step S205, stand controller 410 receives an operation (unlocking request) to unlock electronic lock 50 by the user.

In step S206, stand controller 410 determines whether or not the operation to unlock electronic lock 50 received in step S205 is an operation to press an emergency stop button 422 provided in operation terminal 420 (see FIG. 6) of power stand 400. When emergency stop button 422 has been pressed (Yes in S206), the process proceeds to step S220. When emergency stop button 422 has not been pressed (No in S206), the process proceeds to step S207. An unlocking operation when emergency stop button 422 has not been pressed is the operation to unlock electronic lock 50 in coordination with unlocking of vehicle door 90 (see FIG. 6).

In step S207, stand controller 410 determines whether or not output in external power feed is larger than 16 A. Specifically, stand controller 410 determines whether or not a detection value from current sensor 60 is larger than 16 A. When the output is larger than 16 A (Yes in S207), the process proceeds to step S208. When the output is equal to or lower than 16 A (No in S207), the process proceeds to step S220.

In step S208, stand controller 410 rejects the request to unlock electronic lock 50. In other words, stand controller 410 prohibits unlocking of electronic lock 50. In this case, since a command to unlock electronic lock 50 is not transmitted from power stand 400 to vehicle 300, the state of locking by electronic lock 50 is kept.

In step S209, stand controller 410 transmits a command signal to vehicle 300 to have notification apparatus 70 (car navigation system) give a notification that the output in external power feed (the detection value from current sensor 60) is larger than 16 A. As vehicle controller 110 controls notification apparatus 70 based on the command signal, a message that the request to unlock electronic lock 50 was rejected is shown on screen 71 (see FIG. 3) of notification apparatus 70.

In step S210, stand controller 410 has operation terminal 420 of stand controller 410 show contents (see FIG. 5) as shown in screen 202 of portable terminal 200 in the first embodiment. Stand controller 410 may have the contents shown on screen 202 of portable terminal 200 as in the first embodiment.

In step S220, stand controller 410 notifies vehicle 100 that vehicle plug 120 has been inserted in vehicle inlet 40 through communication unit 413.

In step S221, stand controller 410 controls output in external power feed to be equal to or lower than 16 A. For example, stand controller 410 transmits a command signal to vehicle 300 so as to change the on and off cycle (duty ratio) of the not-shown switching element of DC/AC converter 30. When the output in external power feed has already been equal to or lower than 16 A, processing in step S221 is not performed.

In step S222, stand controller 410 transmits a command signal to unlock electronic lock 50 to vehicle 300.

In step S223, stand controller 410 stops external power feed after it senses unlocking of electronic lock 50 in vehicle 300 based on the command signal in step S222. Thereafter, the process ends.

Though an example in which the threshold value of output in external power feed at which external power feed can be started and the threshold value of output in external power feed at which unlocking of electronic lock 50 is prohibited are both 16 A is shown in the first and second embodiments, the present disclosure is not limited as such. The threshold value of the output in external power feed at which external power feed can be started and the threshold value of the output in external power feed at which unlocking of electronic lock 50 is prohibited may be different from each other.

Though control during external power feed is shown by way of example in the first and second embodiments, the present disclosure is not limited as such. Control as in the first and second embodiments may be carried out during external charging (charging from the home electrical appliance or the power stand to the vehicle).

Though an example in which each of portable terminal 200 and notification apparatus 70 is controlled while unlocking of electronic lock 50 is prohibited is shown in the first embodiment, the present disclosure is not limited as such. For example, any one of portable terminal 200 and notification apparatus 70 may be controlled. Alternatively, neither of portable terminal 200 and notification apparatus 70 may be controlled. In the second embodiment as well, any one of operation terminal 420 of power stand 400 and notification apparatus 70 may be controlled while unlocking of electronic lock 50 is prohibited. Alternatively, neither of operation terminal 420 and notification apparatus 70 may be controlled.

Though an example in which electronic lock 50 is unlocked regardless of output in external power feed when button 121 in vehicle plug 120 (emergency stop button 422 of power stand 400) is pressed is shown in the first (second) embodiment, the present disclosure is not limited as such. Unlocking of electronic lock 50 under such a condition that output in external power feed is larger than 16 A may be prohibited also in the case above.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:
1. A vehicle comprising:
a secondary battery;
a vehicle inlet to which a vehicle plug is connected, the vehicle plug allowing power transmission including at least one of external charging and external power feed;
an electronic lock that locks the vehicle inlet and the vehicle plug; and
a vehicle controller that controls the electronic lock, wherein
when output in the power transmission is larger than a prescribed value at time of reception of a request for release of locking by the electronic lock from a user, the vehicle controller prohibits release of locking by the electronic lock, and
when output in the power transmission is equal to or lower than the prescribed value at the time of reception of the request for release of the locking by the electronic lock from the user, the vehicle controller releases locking by the electronic lock.

2. The vehicle according to claim 1, wherein while locking by the electronic lock is inactive, the vehicle controller prohibits start of the power transmission under a condition that output in the power transmission is larger than the prescribed value.

3. The vehicle according to claim 1, further comprising a notification apparatus that gives a notification to the user, wherein
when the vehicle controller prohibits release of the locking by the electronic lock because of the output in the power transmission being larger than the prescribed value at the time of reception of the request for release of locking by the electronic lock from the user, the vehicle controller controls the notification apparatus to give a notification that the output in the power transmission is larger than the prescribed value.

4. The vehicle according to claim 1, further comprising a communication apparatus that communicates with a terminal capable of receiving an operation by the user, wherein
when the vehicle controller prohibits release of locking by the electronic lock because of the output in the power transmission being larger than the prescribed value, the communication apparatus transmits to the terminal, a signal about release of locking by the electronic lock.

5. The vehicle according to claim 1, wherein
the request for release of locking by the electronic lock includes a first request and a second request different from the first request,
when the output in the power transmission is larger than the prescribed value at the time of reception of the first request from the user, the vehicle controller prohibits release of locking by the electronic lock,
when the output in the power transmission is equal to or lower than the prescribed value at the time of reception of the first request from the user, the vehicle controller releases locking by the electronic lock, and
at the time of reception of the second request from the user, regardless of the output in the power transmission, the vehicle controller controls the output in the power transmission to be equal to or lower than the prescribed value and releases locking by the electronic lock.

6. The vehicle according to claim 5, further comprising a vehicle door for entry into and exit from the vehicle, wherein
the first request is a request for release of locking by the electronic lock in coordination with unlocking of the vehicle door, and
the second request is a request for release of locking by the electronic lock based on pressing of an unlocking button provided in the vehicle plug.

7. A power apparatus comprising:
a vehicle plug that allows power transmission including at least one of external charging and external power feed by being connected to a vehicle inlet of a vehicle on which a secondary battery is mounted; and
an apparatus-side controller that controls an electronic lock that locks the vehicle inlet and the vehicle plug, wherein
when output in the power transmission is larger than a prescribed value at time of reception of a request for release of locking by the electronic lock from a user, the apparatus-side controller prohibits release of locking by the electronic lock, and
when output in the power transmission is equal to or lower than the prescribed value at the time of reception of the request for release of locking by the electronic lock from the user, the apparatus-side controller releases locking by the electronic lock.

\* \* \* \* \*